United States Patent
Farina et al.

(10) Patent No.: US 12,155,729 B2
(45) Date of Patent: Nov. 26, 2024

(54) APP PINNING IN VIDEO CONFERENCES

(71) Applicant: Zoom Video Communications, Inc., San Jose, CA (US)

(72) Inventors: Kevin Farina, Los Angeles, CA (US); Arun Janakiraman, San Francisco, CA (US); Ross Douglas Mayfield, Palo Alto, CA (US); Kwon Woong Oh, Mukilteo, WA (US); Shishir Sharma, Ottawa (CA)

(73) Assignee: Zoom Video Communications, Inc., San Jose, CA (US)

( * ) Notice: Subject to any disclaimer, the term of this patent is extended or adjusted under 35 U.S.C. 154(b) by 120 days.

(21) Appl. No.: 17/733,491

(22) Filed: Apr. 29, 2022

(65) Prior Publication Data

US 2023/0300204 A1    Sep. 21, 2023

Related U.S. Application Data

(60) Provisional application No. 63/321,478, filed on Mar. 18, 2022.

(51) Int. Cl.
*H04L 67/146* (2022.01)
*H04L 65/403* (2022.01)

(52) U.S. Cl.
CPC .......... *H04L 67/146* (2013.01); *H04L 65/403* (2013.01)

(58) Field of Classification Search
CPC .............................. H04L 67/146; H04L 65/403
See application file for complete search history.

(56) References Cited

U.S. PATENT DOCUMENTS

| | | | |
|---|---|---|---|
| 2013/0018950 A1* | 1/2013 | Narayanan | H04L 12/1818 709/204 |
| 2015/0163066 A1 | 6/2015 | Derosa et al. | |
| 2017/0116579 A1* | 4/2017 | Emejulu | G06Q 10/1095 |
| 2021/0367986 A1* | 11/2021 | Davuluri | G10L 15/26 |
| 2022/0141044 A1* | 5/2022 | Burpee | G06Q 10/1093 709/204 |

OTHER PUBLICATIONS

EP International Search Report and Written Opinion for PCT/US2023/014819 mailed Jun. 21, 2023.

* cited by examiner

*Primary Examiner* — Olisa Anwah
(74) *Attorney, Agent, or Firm* — Kilpatrick Townsend & Stockton LLP

(57) ABSTRACT

A client device may receive a meeting link for a meeting hosted by a video conference provider. The meeting link may include information associated with a suggested application. In response to a selection of the meeting link, the client device may join the meeting via the video conference provider utilizing a video conference application and execute the suggested application. The suggested application may be controlled by the client device from the video conference application. The client device may receive application content from a meeting participant via the video conference provider and display the application content using the suggested application.

20 Claims, 12 Drawing Sheets

APP PINNING IN VIDEO CONFERENCES

BACKGROUND OF THE INVENTION

The present application relates generally to video conferences and various functions therein, and more particularly providing applications in a video conference.

DETAILED DESCRIPTION OF THE INVENTION

Video conferences have grown in popularity, allowing more convenient communication in areas such as office work, education, and personal communication. But however convenient video conferences may be, they are not without their limitations. One drawback to video conferences may be the coordination of multiple parties not being in the same place. For example, a meeting may require all participants to have copies of the same file so that it may be discussed. For in-person meetings, the file may be distributed as a document at the same time to everyone, so that all meeting participants may be on the same page at the same time. Video conferences, however, rely on each participant being prepared independently. This can lead to some meeting participants not having the required files or not having the files when needed. Meetings can be delayed or inefficient due to all meeting participants independently preparing the necessary materials, or failing to do so. Thus, a need exists to provide application data in a coordinated manner for video conferences.

Additionally, applications to be used during a video conference may require all meeting participants to have the application installed on their device. This presents a similar coordination problem to the distribution of files. All of the meeting participants may be required to independently install an application needed for the meeting.

A solution to these drawbacks is to "pin" an application to a meeting invite, prompting meeting participants to install and open an application when a video conference begins. Further, application data may be included in a meeting link through deeplinking, such that the application presents specific information to all meeting participants. The systems and methods described herein may be used to provide meeting participants with applications and application data, overcoming these drawbacks.

This illustrative example is given to introduce the reader to the general subject matter discussed herein and the disclosure is not limited to this example. The following sections describe various additional non-limiting examples and examples of systems and methods for compliance auditing encrypted video conferences.

Figure 1:
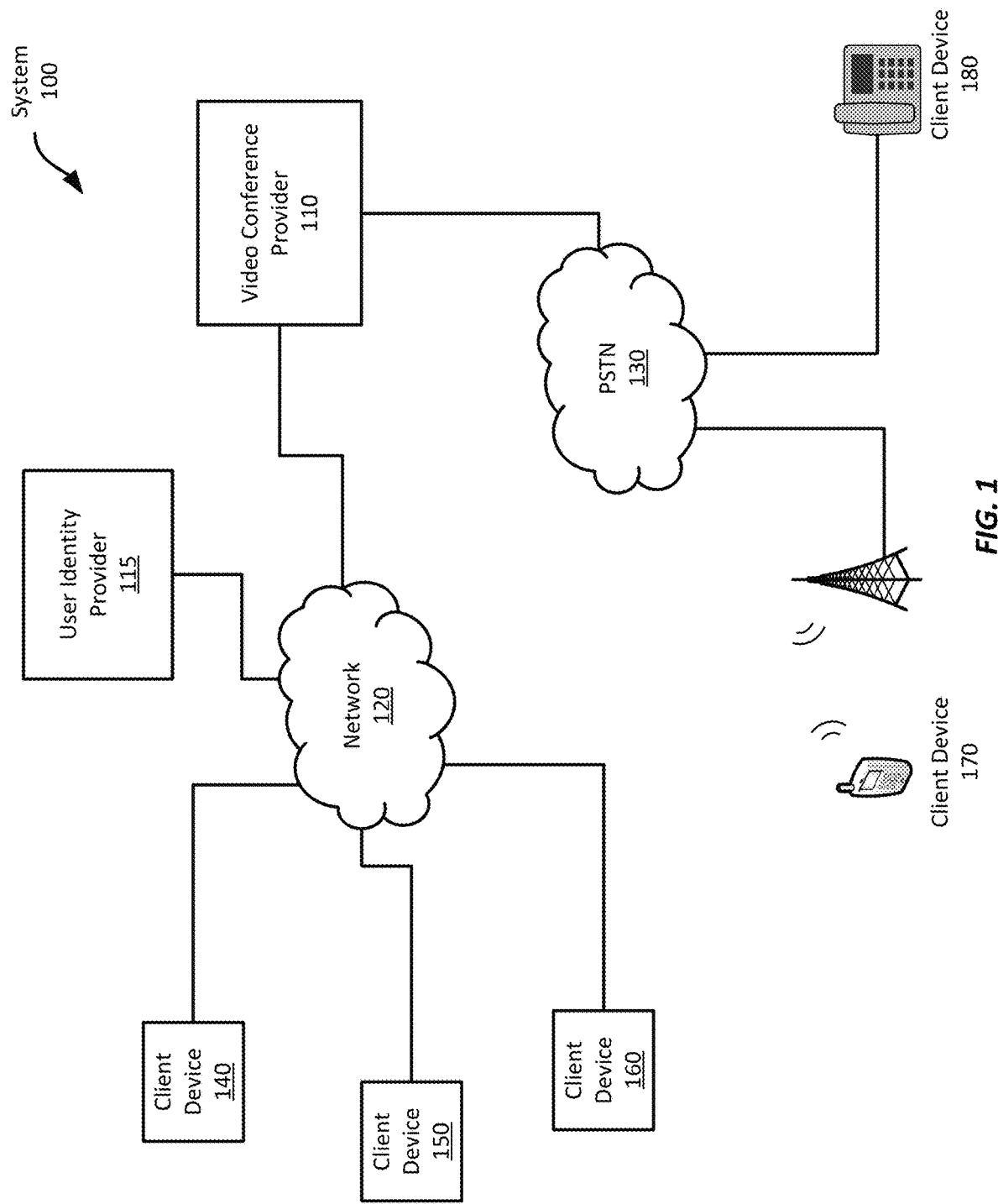
FIG. 1 shows a system that provides videoconferencing functionality to various client devices, according to certain examples.

FIG. 1 shows an example system 100 that provides videoconferencing functionality to various client devices. The system 100 includes a video conference provider 110 that is connected to multiple communication networks 120, 130, through which various client devices 140-180 can participate in video conferences (or "meetings") hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
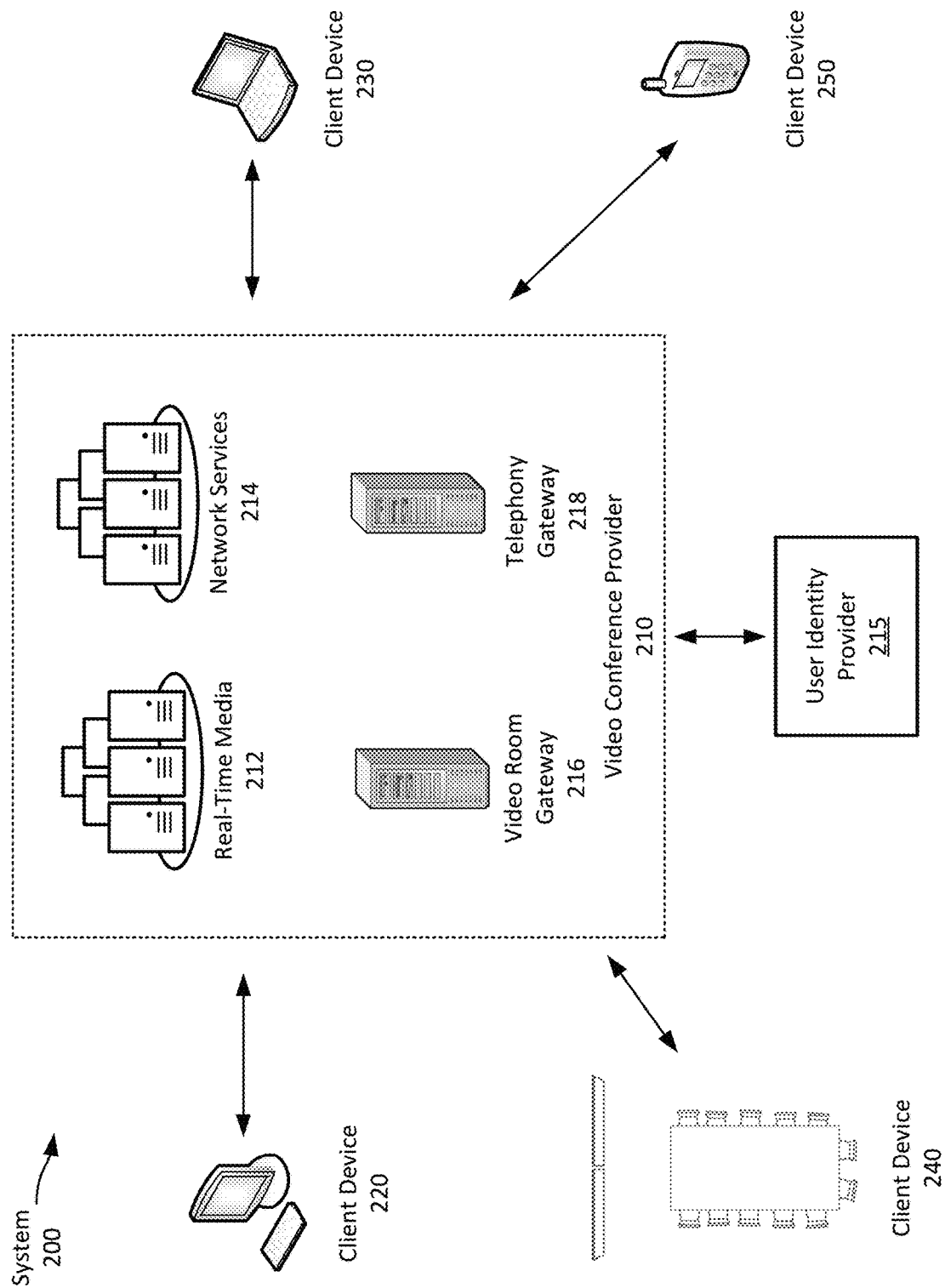
FIG. 2 shows a system in which a video conference provider provides videoconferencing functionality to various client devices, according to certain examples.

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host. Further, one or more applications (or "apps") may be associated with the meeting. The meeting information may include information associated with the one or more apps.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these client devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateway servers 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

The servers 214 may also provide access to one or more apps. The apps may be hosted by the video conference provider 210, or the servers 214 may provide connectivity between one or more client devices and one or more third parties, enabling the one or more client devices to download and install the apps. In some embodiments, the servers 214 may provide a marketplace where a client device may purchase one or more apps.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 220-250 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description. Additionally, the servers 214 may provide links to apps for use by one or more meeting participants.

Referring now to the video room gateway servers 216, these video room gateway servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

The video conference provider may provide access to one or more applications (or, "apps") running on a client device, during a video conference. The apps may be integrated into a video conference interface. An app may be generally understood as an interface element that embodies particular functionality, such as a button or scroll bar, that has a well-defined interface, such as an application programming interface (API), for receiving inputs and providing outputs. An app may be its own self-contained module of executable code or may be incorporated within a larger software application directly or as a part of a library (e.g. a dynamically linked library).

Figure 3:
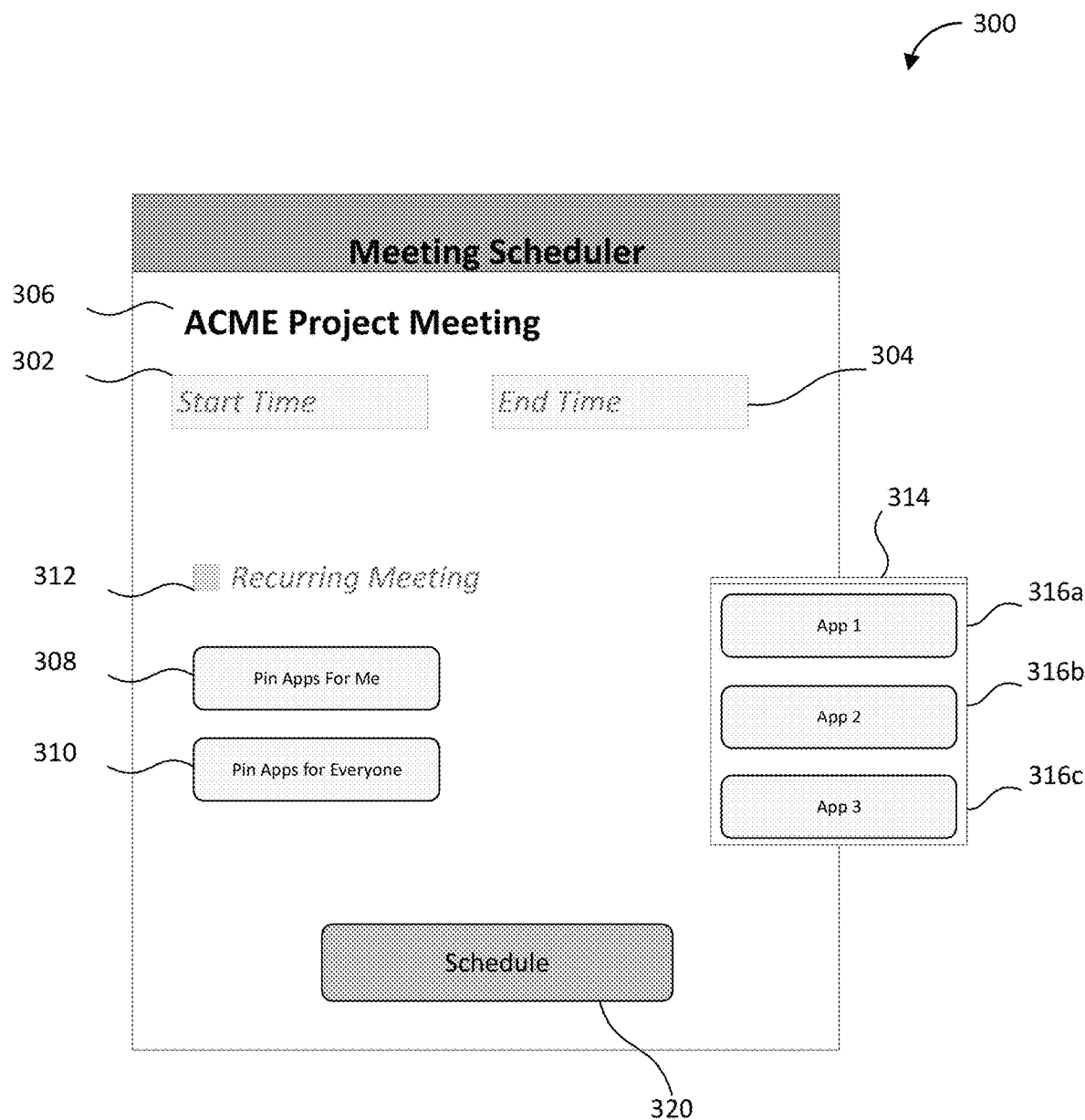
FIG. 3 shows a meeting scheduler window with an app menu, according to certain examples.

FIG. 3 shows a meeting scheduler window 300 with an app menu, according to certain examples. The meeting scheduler window 300 may include input fields including a start time field 302, an end time field 304, and a meeting title field 306. The meeting scheduler window 300 may also include a user app button 308 and a meeting app button 310. The meeting scheduler window 300 may also include a recurring meeting field 312. The meeting scheduler window may include other fields associated with other options for the meeting (not pictured), such as invitees, a meeting date, and other relevant information.

The meeting scheduler window 300 may be generated by a host-client device. The host-client device may be a device associated with a host of the meeting and/or a meeting organizer. The meeting scheduler window 300 may be generated by the host-client device in response to an input corresponding with a meeting request. For example, the meeting request may be made from a video conference application, associated with the video conference provider. In other embodiments, the meeting may be made from a web browser or other such means.

A user of the host-client device may input a start time in the start time field 302. Similarly, the user of the host-client device may input an end time in the end time field 304 and a meeting title in the meeting title field 306. The recurring meeting field 312, when selected, may cause the meeting associated with the meeting scheduler window 300 to be scheduled at the video conference provider at regular intervals (e.g., weekly, daily, monthly, etc.). Information entered into the input fields may then be saved by the host-client device as meeting data.

An app menu 314 may be generated by the host-client device upon an input corresponding to the user app button 308 and/or the meeting app button 310. The app menu 314 may be populated with apps 316a-c by the host-client device by determining one or more apps that are installed on the host-client device. In some embodiments, the app menu 314 may include apps that are not installed on the host-client device, but are available to be installed on the host-client device. Although only three apps 316a-c are shown, any number of apps may be displayed in the app menu 314.

Upon a user input corresponding to an app 316a-c, the app may be "pinned" to the meeting associated with the meeting scheduler window 300, either for the user of the host-client device or for all meeting participants. Pinning an app may include associating an app with one or more meetings, such that upon the start of the meeting, the pinned app is executed and controlled through the video conference application. A pinned app may be executed on the host-client device and/or client devices associated with one or more meeting participants. For example, the app menu 314 may be generated in response to a user input corresponding to the user app button 308. Subsequently, a user input corresponding to app 316a may pin app 316a to the meeting associated with the meeting scheduler window 300, such that the app 316a is executed and controlled from the video conference application upon the start of the meeting. In this case, the app 316a is pinned just for the host-client device.

In another example, the app menu 314 may be generated in response to a user input corresponding to the meeting app button 310. A user input corresponding to app 316b may pin the app 316b for all meeting participants. Information corresponding to the app 316b may then be saved by the host-client device with the meeting data, and the app 316b pinned for all meeting participants of the meeting associated with the meeting scheduler window 300.

Upon a user input corresponding to a schedule button 320, the meeting data may be transmitted to the video conference provider. The video conference provider may then create a meeting link. The meeting link may include information that directs a client device to execute the video conference application at a certain time. The meeting link may also include information that used by the client device to open an app, such as the pinned app 316b, from the video conference application. The app may then be executed and controlled from the video conference application.

In some examples, the meeting link may include information that directs the client device to open the video conference application, open the app, and then display a specific location within the app (this process may be referred to as "deeplinking"). The specific location may correspond to a logical container such as a folder, or a specific file. The specific location may correspond to a particular operation of the app. By deeplinking the meeting participants to the specific location, a video conference may be more efficient, with all client devices navigating to the required data or operation by virtue of clicking the link and joining the video conference. This may eliminate chances for error and delays while meeting participants navigate to the specific location independently. After creating the meeting link, the video conference provider may transmit the meeting link to one or more client devices, such as with a meeting invitation.

Figure 4:
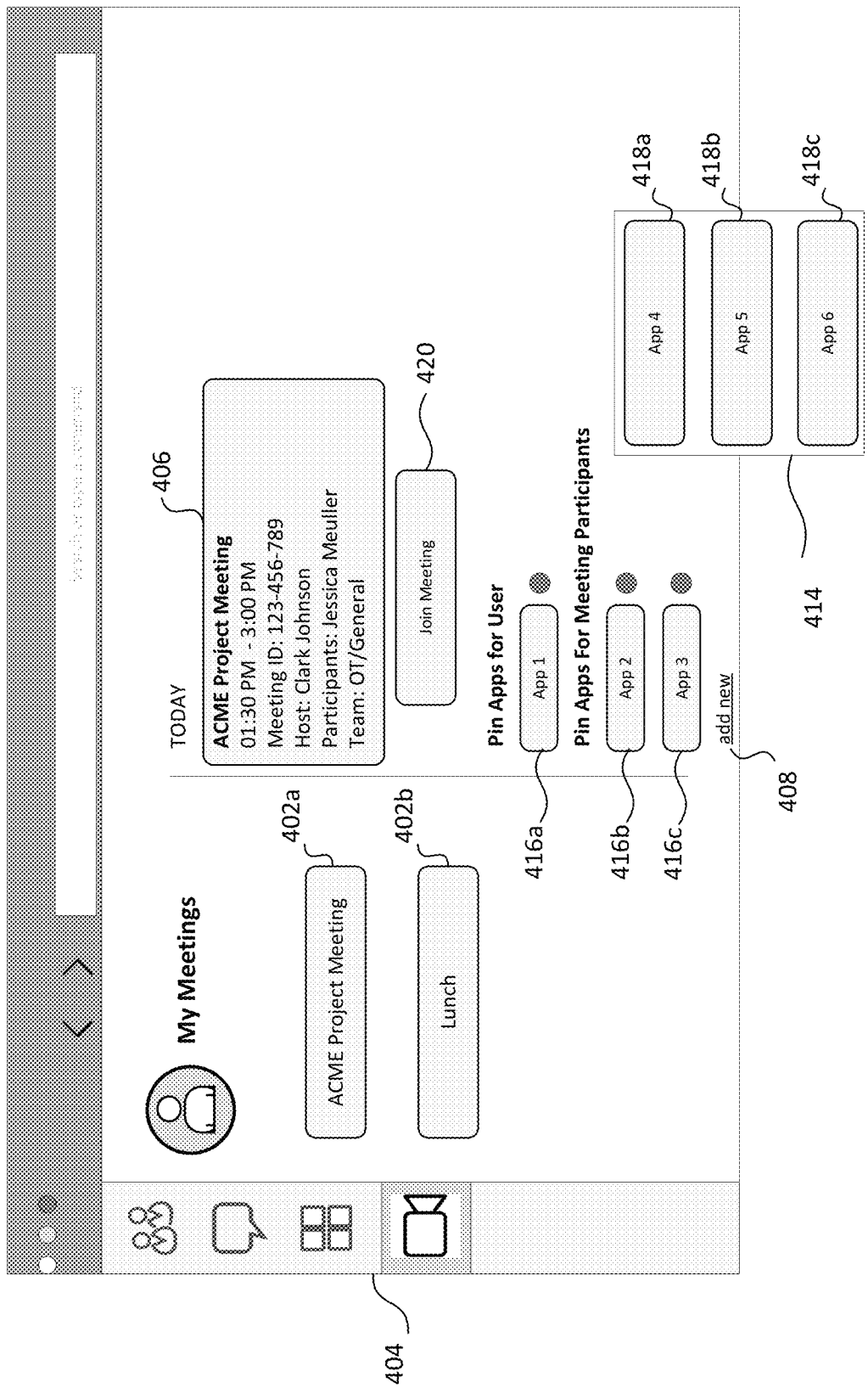
FIG. 4 shows a meeting control panel with apps, according to certain examples.

FIG. 4 shows a meeting control panel 400 with pinned apps 416a-c, according to certain examples. The meeting control panel may be displayed from the video conference application on a host-client device. The host-client device may be associated with a meeting host and/or organizer of the meeting associated with the meeting control panel 400. The meeting control panel 400 may display one or more scheduled meetings 402a and 402b. Although only two scheduled meetings are shown, any number of meetings may be displayed. The meeting control panel may be accessed by the host-client device in response to an input corresponding to a button included on a sidebar 404 within the video conference application.

The meeting host may select a scheduled meeting such as the scheduled meeting 402a. The host-client device may then display a meeting information window 406. The meeting information window may display meeting information associated with the scheduled meeting 402a. The meeting information may include a title of the meeting, start and end times, a meeting identifier, meeting participant information, and other relevant information associated with the meeting.

The meeting control panel 400 may also display one or more pinned apps 416a-c. The pinned apps 416a-c may be pinned for the host-client device, such as the pinned app 416a, or pinned for all meeting participants, such as the pinned apps 416b-c. In some embodiments, the buttons associated with the pinned apps 416a-c may be moved within meeting control panel 400. Moving a button associated with a pinned app may cause the pinned app to be pinned for different client devices. For example, FIG. 4 shows the pinned app 416a under the "pin apps for user" heading. The pinned app 416a may therefore be pinned only for the host-client device. In response to a user input, the button associated with the pinned app 416a may be moved to the "pin apps for meeting participants" heading. The pinned app 416a may then be pinned for all meeting participants. The host-client device may then send information to the video conference provider associated with the change in pinned app 416a. The video conference provider may then update a meeting link already sent to one or more client devices such that the updated meeting link includes information about pinned app 416a.

The meeting control panel 400 may also include an add new button 408. In response to a user input corresponding to the add new button 408, an app menu 414 may be generated. The app menu 414 may be populated with pinned apps 416a-c by the host-client device by determining one or more apps that are installed on the host-client device. In some embodiments, the app menu 414 may include apps that are not installed on the host-client device, but are available to be installed on the host-client device. Although only three apps 418a-c are shown, any number of apps may be displayed in the app menu 414. In response to a user input corresponding to one or more of the apps 418a-c, the apps 418a-c may become new pinned apps, either for the host-client device or the client devices associated with the respective meeting participants. The host-client device may send information to the video conference provide, causing the meeting link associated with the meeting to be updated to include the new pinned apps.

In some examples, the meeting control panel 400 may be displayed on a client device associated with a meeting participant other than the host-client device associated with the meeting host. In this case, the buttons associated with the pinned apps 416a-c may not be moveable. The client device may still be able to add apps 418a-c, but only as apps pinned for that client device. In other words, the meeting control panel 400 may not permit a meeting participant to pin apps for other participants. In some examples, the meeting host may grant permissions to the client device, allowing the client device to pin the apps 418a-c for other meeting participants.

The meeting control panel 400 may include a join button 420. The join button 420 may include the meeting link. The meeting link may cause the client device to open a meeting window within the video conference application. The meeting link may also include information associated with one or more pinned apps, such as the pinned apps 416a-c. Although the meeting link and meeting information are described as being included in the meeting control panel 400, other methods are considered. For example, the video conference provider may provide a meeting link to be transmitted via alternate means, such as through email communication. The meeting link may also be provided via a calendar associated with one or more meeting participants. One of ordinary skill in the art would recognize many alternate delivery methods.

Figure 5:
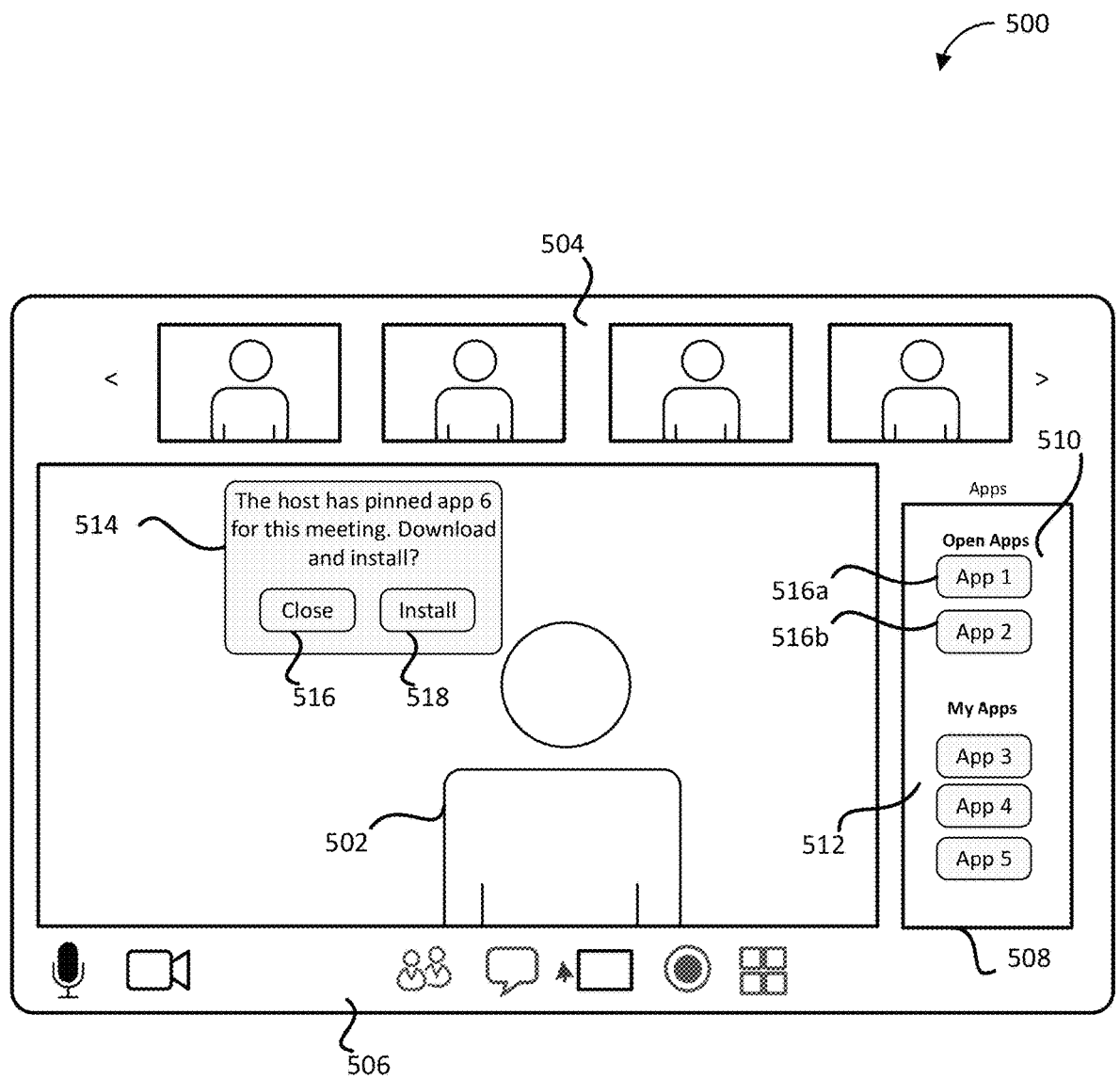
FIG. 5 shows a meeting window with an install prompt according to certain examples.

FIG. 5 shows a meeting window 500 with an install prompt 514 according to an example. The meeting window 500 may be displayed in the video conference app in response to a user input corresponding to a meeting link, such as is described in FIG. 4. In some embodiments, the meeting window 500 may open automatically at a start time of the meeting associated with the meeting window 500.

The meeting window 500 may include a speaker display 502, a participant bar 504, a control bar 506, and an app window 508. The app window 508 may further include an open app list 510 and an installed app list 512. The speaker display 502 may show a meeting participant and/or meeting host, associated with the meeting window 500, currently transmitting video and/or audio communications. The participant bar 504 may display one or more meeting participants. The control bar 506 may include one or more meeting controls such as a mute button, a record button, a chat button, and other relevant video conference controls.

The app window 508 may display one or more apps associated with the client device. The open app list 510 may include one or more open apps, such as open apps 516a-b. The open apps 516a-b may be executed and controlled from the video conference application. In some examples, the open apps 516a-b may run within the video conferencing application. For example, the video conferencing application may execute an embedded web browser, within which one or more apps may run.

Figure 8:
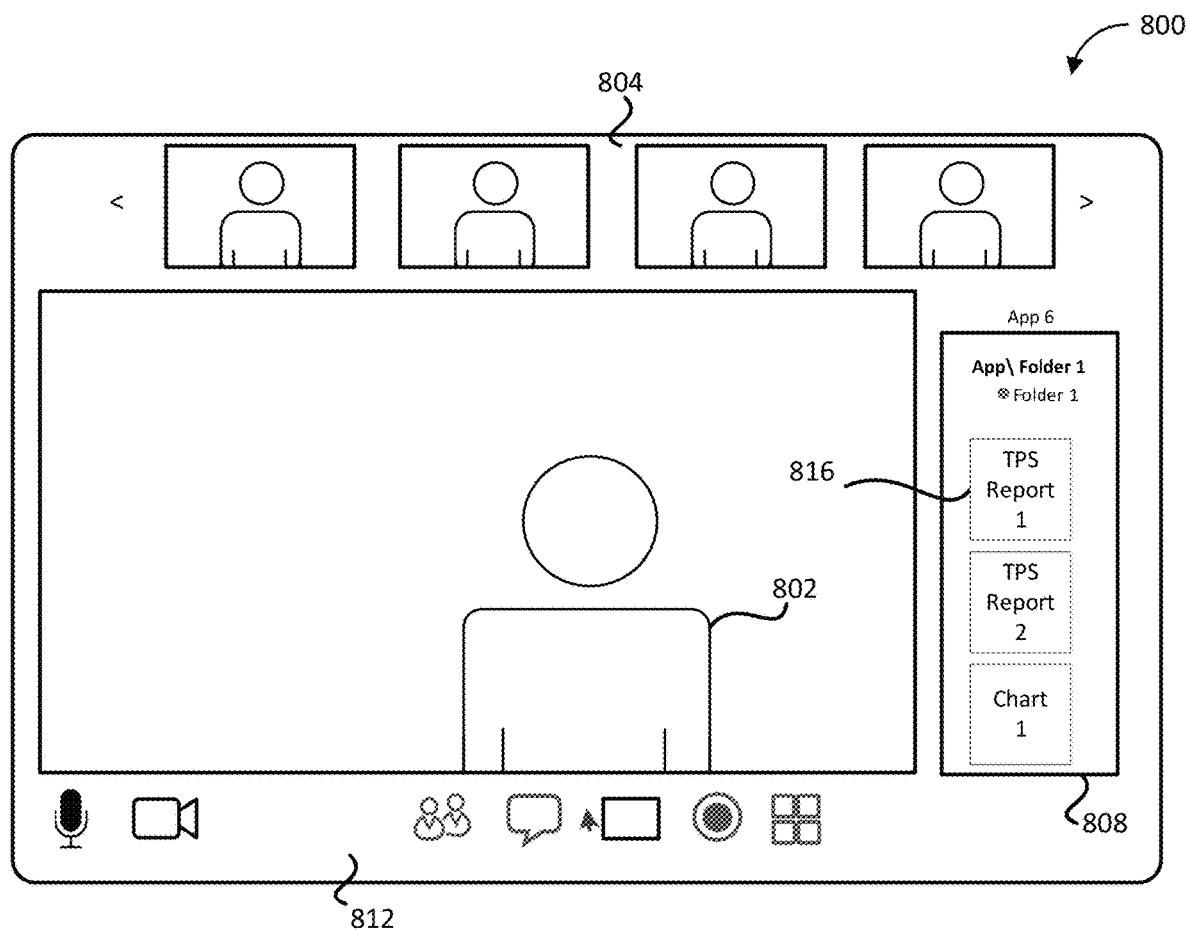
FIG. 8 shows a meeting window with an app window opened directly to a specific location, according to certain examples.

In some examples, executing the video conferencing application may launch an execution environment (such as a web browser, a Java Virtual Machine, Android Runtime, or any other suitable execution environment). The video conferencing application may be executed within the execution environment. The open apps 516a-b may also be executed in the execution environment. Control of the open apps 516a-b may be provided within the video conferencing application, such as through a Graphical User Interface. In some examples, the open apps 516a-b may be running in the background, and not displayed in the meeting window 500. In other embodiments, the open apps 516a-b may be running inside the meeting window, as is shown in FIG. 8. The installed app list 512 may display all apps installed on the client device, configured to be executed and controlled from the video conference application.

One or more suggested apps may be pinned to the meeting associated with the meeting window 500. For example, the meeting host may have pinned the app 418c from FIG. 4 for all meeting participants. When the meeting window was opened from the associated meeting link, or when the meeting started automatically at as associated start time, the client device received information associated with the suggested app. Upon receiving the information associated with the suggested app, the client device may determine that the suggest app is not installed. The client device may then generate the install prompt 514.

The install prompt window may display information regarding the suggested app. The information may include a name of the app, the name of the meeting host, or other relevant information. In some examples, the user associated with the client device may not wish to install the suggested app. In response to a user input corresponding to a close button 516, the install prompt 514 may close, and no longer be displayed in the meeting window 500.

In other examples, the user associated with the client device may wish to install the suggested app. In response to a user input corresponding to an install button 518, the client device may transmit a request for the suggested app. In some embodiments, the request may be transmitted to the video conference provider. In other embodiments, the request may be transmitted to a third-party associated with the app. The client device may subsequently receive information associated with the suggested app and cause the app to be displayed in the installed app list 512.

Figure 6:
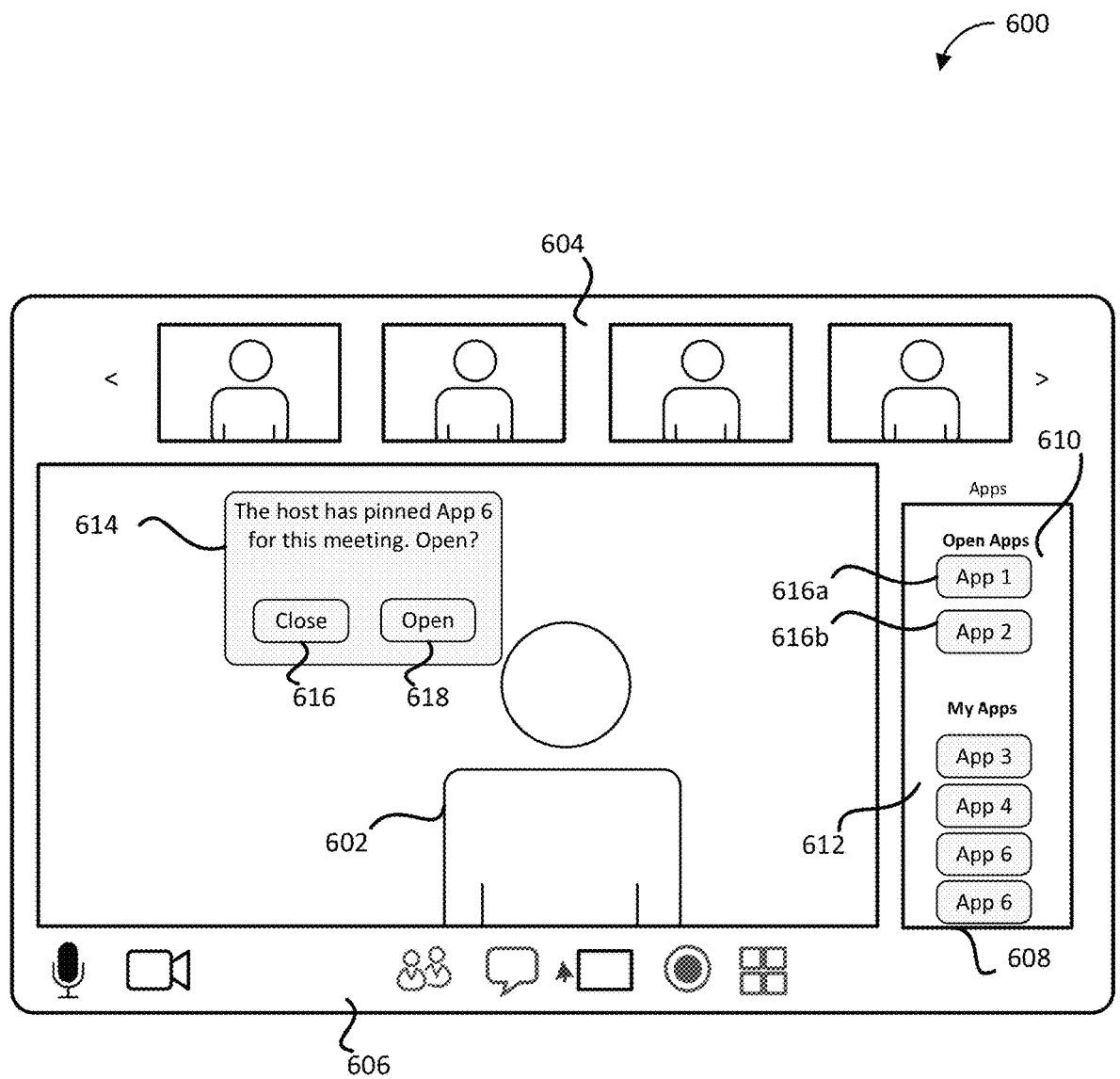
FIG. 6 shows a meeting window with an open prompt, according to certain examples.

FIG. 6 shows a meeting window 600 with an open prompt 614 according to an example. The meeting window 600 may be the same as the meeting window 500 in FIG. 5, after the suggested app was installed. Alternatively, the meeting window 600 may be a different meeting window displayed on a different client device where the suggested app is already installed. The meeting window 600 may be displayed in the video conference app in response to a user input corresponding to a meeting link, such as is described in FIG. 4. In some embodiments, the meeting window 600 may open automatically at a start time of the meeting associated with the meeting window 600.

The meeting window 600 may include a speaker display 602, a participant bar 604, a control bar 606, and an app window 608. The app window 608 may further include an open app list 610 and an installed app list 612. The speaker display 602 may show a meeting participant and/or meeting host, associated with the meeting window 600, currently transmitting video and/or audio communications. The participant bar 604 may display one or more meeting participants. The control bar 606 may include one or more meeting controls such as a mute button, a record button, a chat button, and other relevant video conference controls.

The app window 608 may display one or more apps associated with the client device. The open app list 610 may include one or more open apps, such as open apps 616a-b. The open apps 616a-b may be executed and controlled from the video conference application. In some embodiments, the open apps 616a-b may be running in the background, and not displayed in the meeting window 600. In other embodiments, the open apps 616a-b may be running inside the meeting window, as is shown in FIG. 8. The installed app list 612 may display all apps installed on the client device, configured to be executed and controlled from the video conference application. The installed app list 612 may include the suggested app. The suggested app may have been installed in response to an install prompt, such as the install prompt 514 in FIG. 5 or installed in some other fashion.

One or more suggested apps may be pinned to the meeting associated with the meeting window 600. For example, the meeting host may have pinned the app 418c from FIG. 4 for all meeting participants. When the meeting window was opened from the associated meeting link, or when the meeting started automatically at as associated start time, the client device received information associated with the suggested app. Upon receiving the information associated with the suggested app, the client device may determine that the suggest app is installed. The client device may then generate the open prompt 614.

The open prompt 614 may display information associated with the suggested app, such as an app name, the name of the meeting host, or other relevant information. In some examples, the user associated with the client device may not wish to open the suggest app. In response to a user input corresponding to a close button 616, the open prompt 614 may close, and no longer be displayed in the meeting window 600.

In other examples, the user associated with the client device may wish to open the suggested app. In response to a user input corresponding to an open button 618, the client device may execute the suggested app. The suggested app may be executed and controlled from the video conference application. In some examples, the suggested app may run in the background and therefore not displayed in the meeting window 600. In other examples, the suggested app may be run and displayed within the meeting window 600.

Figure 7:
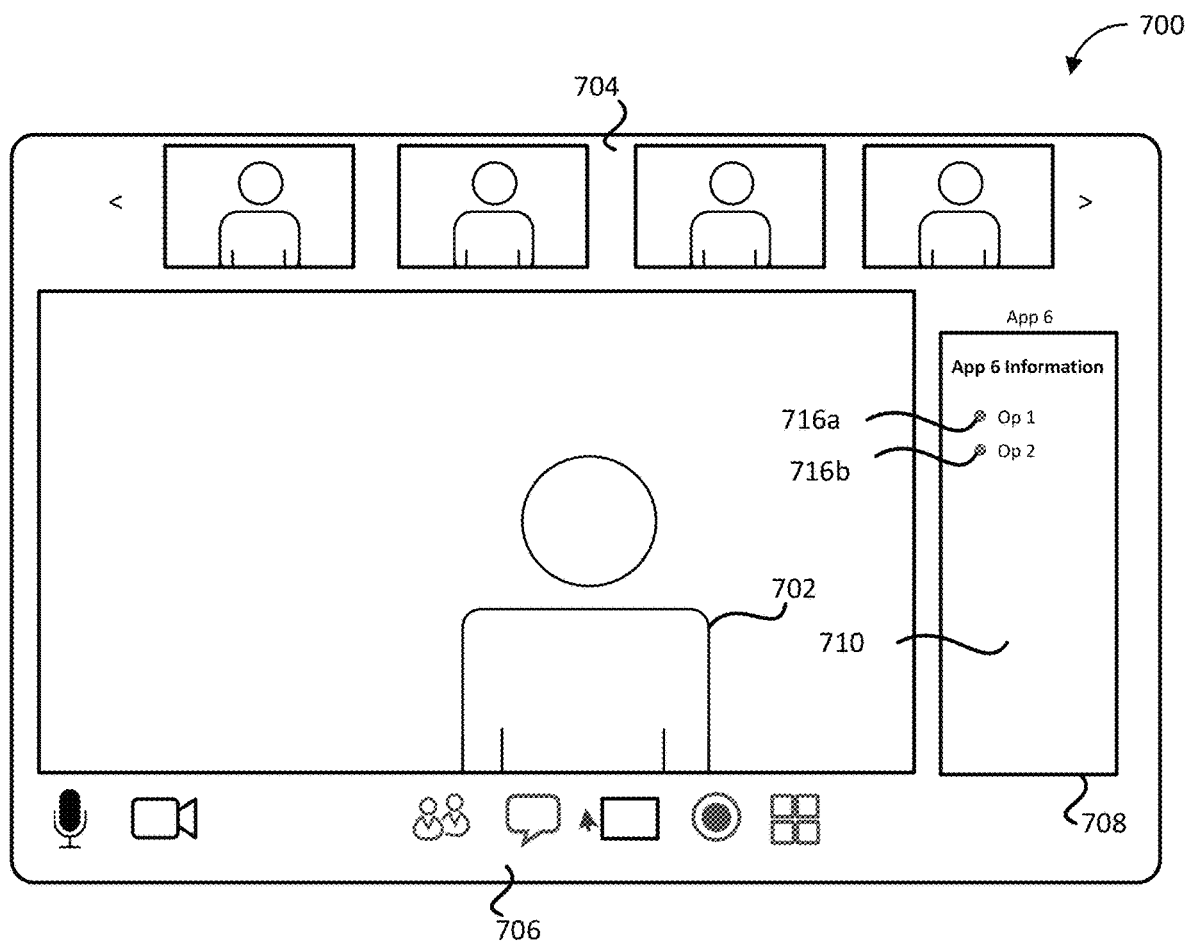
FIG. 7 shows a meeting window with an app panel, according to certain examples.

FIG. 7 shows a meeting window 700 with an app panel 708, according to certain examples. The meeting window 700 may be the meeting window 700 from FIG. 6, with a suggested app running in the app panel 708. The meeting window 700 may include a speaker display 702, a participant bar 704, a control bar 706, and an app panel 708. The app panel 708 may further include a main control page 710. The speaker display 702 may show a meeting participant and/or meeting host, associated with the meeting window 700, currently transmitting video and/or audio communications. The participant bar 704 may display one or more meeting participants. The control bar 706 may include one or more meeting controls such as a mute button, a record button, a chat button, and other relevant video conference controls.

The app panel 708 may display information associated with a pinned app, including the main control page 710. In some examples, the meeting link may include information that causes a suggested app to open directly to the main control page 710. The main control page 710 may have one or more operations 716a-b displayed in the app panel. The app may run as part of or in addition to the video conference application. For example, the app may take information such as sound or audio data from the video conference and perform operations on the sound or video data. The app may also access data outside of the video conference application and perform operations on the outside data. The app may affect the video conference application, such as by changing a background or skin of the video conference application.

The operations 716a-b may correspond to a specific location within the app. For example, the app may be a file sharing app. The operation 716a may correspond to a first file, and the operation 716b may correspond to a second file. In another example, the app may be a game platform. The operation 716a may correspond to a first game mode, and the operation 716b may correspond to a second game mode. One of ordinary skill in the art will recognize many different possibilities.

FIG. 8 shows a meeting window 800 with an app panel 808 opened directly to a specific location, according to certain examples. The meeting window 800 may be the meeting window 800 from FIG. 6, with a suggested app running in the app panel 808. The meeting window 800 may include a speaker display 802, a participant bar 804, a control bar 806, and an app panel 808. The app panel 808 may further include an open app list 810 and an installed app list 812. The speaker display 802 may show a meeting participant and/or meeting host, associated with the meeting window 800, currently transmitting video and/or audio communications. The participant bar 804 may display one or more meeting participants. The control bar 806 may include one or more meeting controls such as a mute button, a record button, a chat button, and other relevant video conference controls.

In some examples, the meeting link associated with the meeting window 800 may include information that directs the client device to a predetermined location within the app or to predetermined content, such as to a document received from the meeting host or to a document stored at a location on a network. The meeting link include a deeplink, as is described in relation to FIG. 3. For example, the app panel 808 shows an application opened to a specific location. In this example, the app may be a file sharing application. In response to information included in the meeting link, the client device may cause the file sharing application to be executed and controlled from the video conference application. Furthermore, the information may cause the client device to open the app to specific file 816. The specific file 816 may be displayed in the app panel 808. In other examples the information in the meeting link may cause the application to open to a logical container containing one or more files. Thus, the specific file 816 may be displayed with other files included in the logical container.

Although FIG. 8 shows the app as file sharing application, any sort of application including processor-executable instructions may be used. Examples may include games, design applications, polling applications, and any other application.

Figure 9:
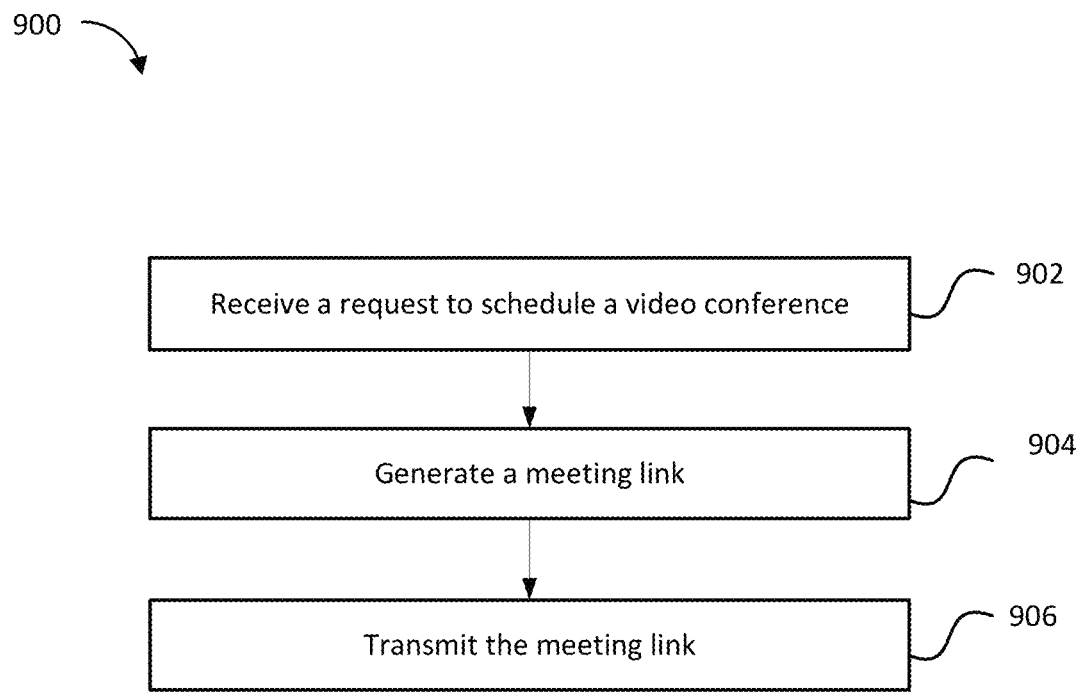
FIG. 9 shows a flowchart of a method for generating a meeting link with deeplinking, according to certain examples.

FIG. 9 shows a flowchart of a method 900 for generating a meeting link with deeplinking, according to certain examples. At step 902, a video conference provider may receive a request to schedule a video conference (or "meeting"). The request may include meeting information and information associated with a suggested app. The meeting information may include a title of the meeting, start and end times, a meeting identifier, meeting participant information, and other relevant information associated with the meeting. The suggested app may include a file sharing application, games, design applications, polling applications, or any other application that may run from the video conferencing application. The request may be transmitted to the video conference provider by a device such as a host-client device as is described above.

At step 904, a meeting link is generated by the video conference provider. The meeting link may be based on the meeting information and the information associated with the suggested application, such as a Uniform Resource Locator (URL). The video conference provider may use the information provided in a meeting scheduler window, such as the meeting scheduler window 300. For example, the video conference provider may use meeting information such as the meeting title and the meeting start time and schedule a video conference according to the meeting information. Then, the video conference provider may generate a unique meeting ID and a meeting passcode corresponding to the video conference. The video conference provider may then encode the unique meeting ID and the meeting passcode in the meeting link.

Generating the meeting link may also include truncating at least a portion of the meeting information. For example, the meeting information and/or information associated with the suggested app may include a web address or other address. The video conference provider may shorten the address to include only those portions of the web address that are necessary to point a client device to the correct meeting, application, or content.

The meeting link may also include embedded information relating to a suggested app. In some examples, the embedded information may cause the client device to generate an open prompt to launch the suggested app at the start of the meeting. In some examples, the meeting link may be configured to cause the suggested application to be opened to a specific location. The meeting link may not refer specifically to the suggested application. For example, the meeting link may reference a particular file that is associated with a related application. The client device may process the embedded information and determine that the particular file is referenced. The client device may then determine that the related application is installed on the client device and execute the related application via the video conferencing application. In another example, the meeting link may reference the suggested application explicitly, instead of or in addition to referencing a particular file.

Although the above passages discusses a particular file, other references are considered. For example, the meeting link may include a reference to a particular operation associated with another related application (e.g., a particular question in a polling app, a particular stage of a game etc.). The client device, in response to a user input corresponding to the meeting link, may execute the other related application via the video conferencing application and direct the other application to the particular operation. One of ordinary skill in the art would recognize many other possibilities.

In some examples, the meeting link may be further configured to direct the client device to download the suggested app. For example, the client device may determine that the suggested app referenced in the meeting app is not installed on the client device. The meeting link may include information to direct the client device to a location where the suggested app may be downloaded.

In some examples, the specific location may be characterized by a previous state of the suggested application. For example, the client device may receive a meeting link for a series of repeating meetings with a suggested application. At the conclusion of one of the meetings in the series of repeated meetings, the client device may transmit information including a new specific location within the suggested app (e.g., a particular polling question in a series of questions). The new specific location may be the last location accessed by the client device during the meeting. The video conference provider may then update the meeting link, such that the link is configured to cause the video conferencing application to open the suggested app to the new specific location. Thus, when the next meeting in the series of meetings begin, the meeting link now directs the video conferencing application to open to the new specific location, and the meeting may continue where it was left.

In some examples, the information associated with the unique meeting ID, the meeting passcode, and the suggested application and/or the specific location may be encoded in the meeting link. Before joining the meeting, the client device may transmit credentials to the video conference provider, host server, third party host, or other authority. The credentials may be associated with the meeting and/or the suggested application. The video conference provider, host server, third party host, or other authority may then authenticate the user device and transmit an approval signal to the client device. The client device may then join the meeting and access the suggested application and/or the specific location.

At step 906, the video conference provider may transmit the meeting link to one or more client devices. The meeting link may be configured to cause a video conferencing application to be executed by a client device. In an example, the client device may receive an input corresponding to the meeting link. In response to the input, the client device may determine that the unique meeting ID is associated with the video conferencing applications. The client device may then execute the video conferencing app, and transmit the unique meeting ID and the meeting passcode to the video conference provider, and join the meeting.

In response to the input, the client device may also execute the suggested app. The suggested app may be run from the video conferencing app.

Figure 10:
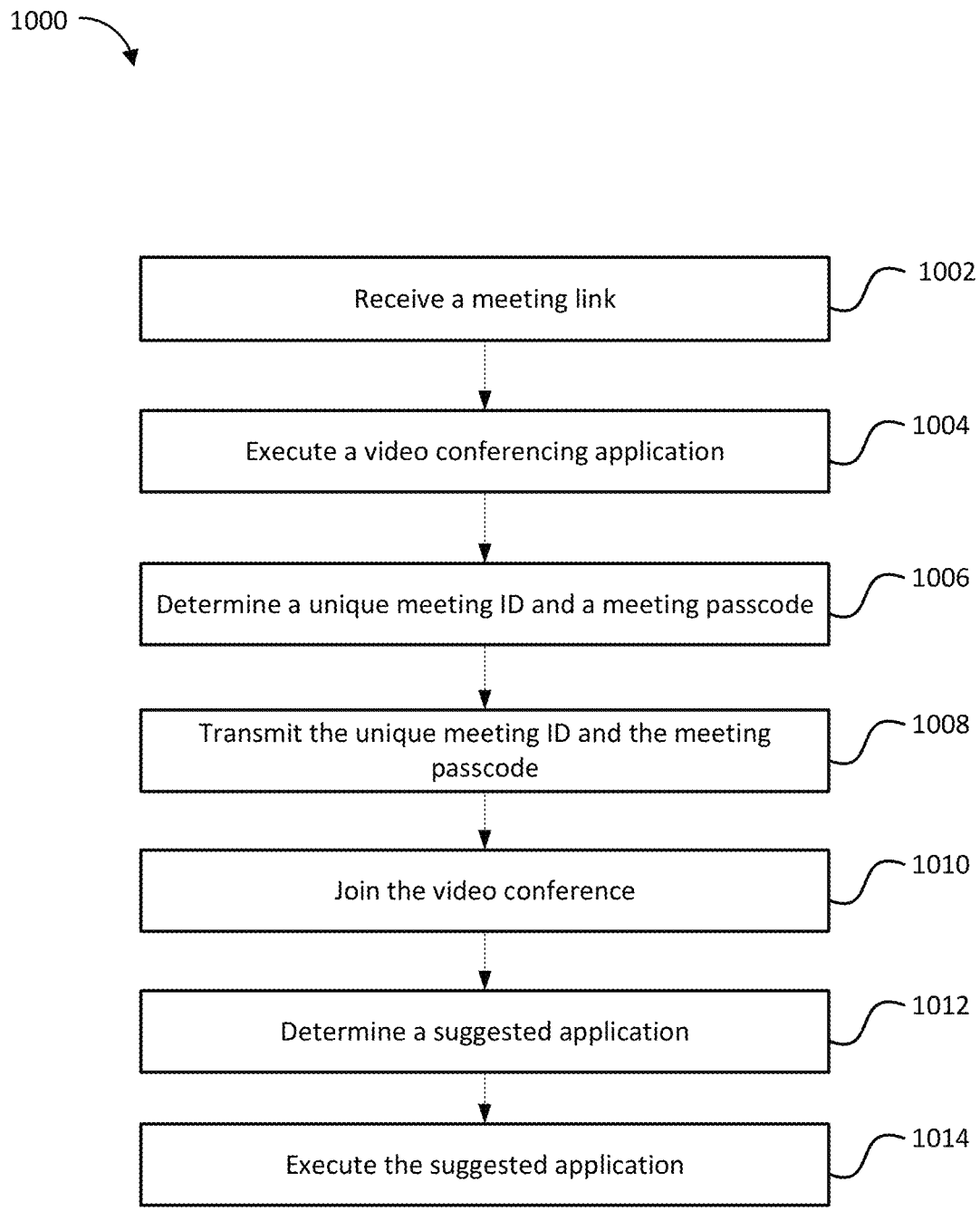
FIG. 10 shows a flow chart of a method for utilizing a meeting link with deeplinking, according to certain examples.

FIG. 10 shows a flow chart of a method 1000 for utilizing a meeting link with deeplinking, according to certain examples. At step 1002, a client device may receive a meeting link associated with a video conference (or "meeting") from a video conference provider. The meeting link may be similar to the meeting link generated by the process 900. At step 1004, in response to a user input corresponding to the meeting link, the client device may execute a video conferencing application associated with the video conference provider. In some examples, executing the video conferencing application may execute an execution environment or runtime environment. The video conferencing application may run inside the execution environment.

At step 1006, the client device may determine a unique meeting ID and a meeting passcode using information included in the meeting link. In some examples, the unique meeting ID and the meeting passcode may be encoded, such that credentials must be authenticated for the client device to use the unique meeting ID and the meeting passcode. In other examples, the unique meeting ID and the meeting passcode may not be encoded (and therefore the meeting is open to the public).

At step 1008, the client device may transmit the unique meeting ID and the meeting passcode to the video conference provider, host server, third party host, or other authority in order to authenticate the user device. The video conference provider, host server, third party host, or other authority may authenticate the client device and transmit an approval signal. At step 1010, the client device may join the meeting. The meeting may be displayed in a meeting window such as the meeting window 600 in FIG. 6.

At step 1012, the client device may determine, using the meeting link, a suggested app. At step 1014, the client device may execute the suggested application via the video conferencing application. The meeting link may not refer specifically to the suggested application. For example, the meeting link may reference a particular file that is associated with a related application. The client device may process the meeting link and determine that the particular file is referenced. The client device may then determine that the related application is installed on the client device and execute the related application via the video conferencing application. In another example, the meeting link may reference the suggested application explicitly, instead of or in addition to referencing a particular file.

Figure 11:
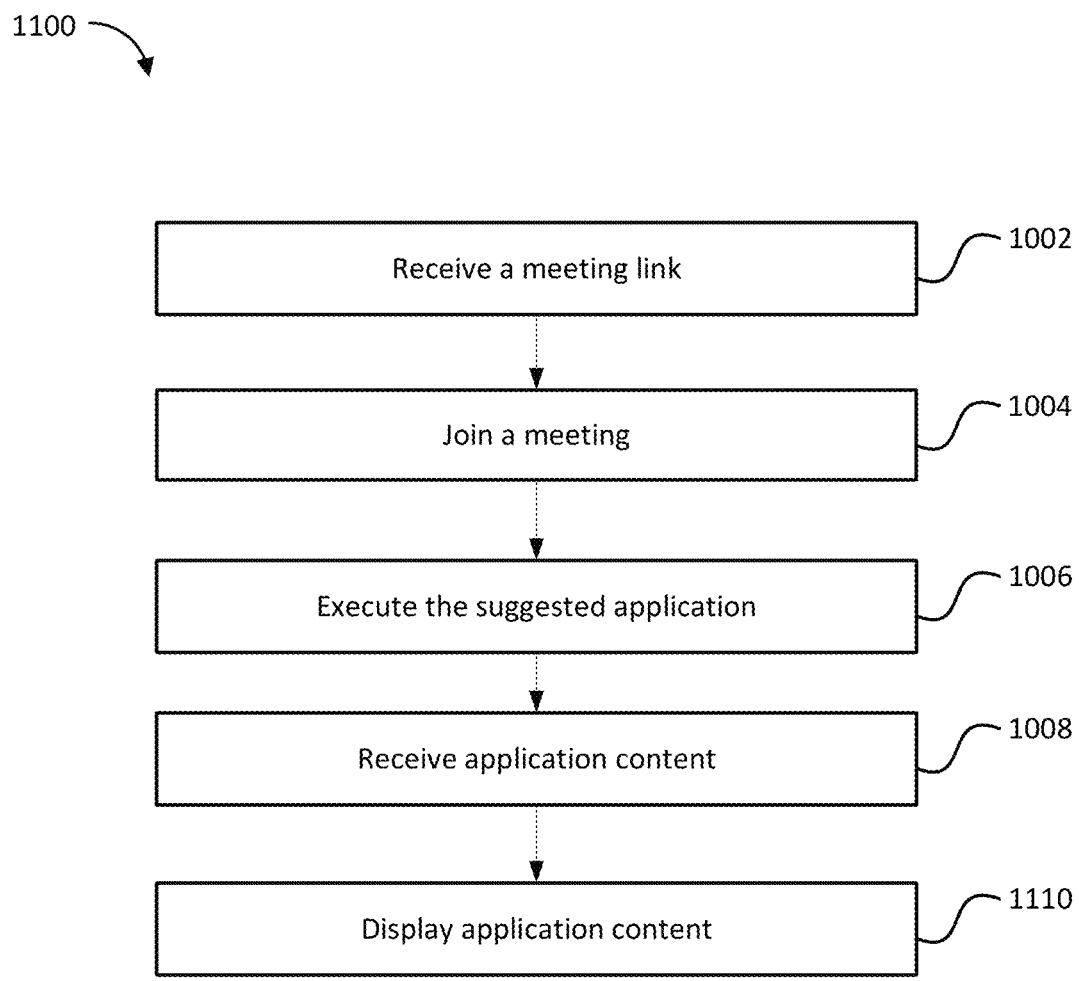
FIG. 11 shows a flowchart of a method for providing an application within a videoconference, according to certain examples.

FIG. 11 shows a flowchart of a method 1100 for providing an application within a videoconference, according to certain examples. At step 1102, a client device may receive a meeting link, where the video conference is hosted by a video conference provider. The meeting link may include information associated with a suggested application (or "app"). The meeting link may be similar to the meeting link described in FIG. 3. The suggested app may be similar to the apps described in FIGS. 7 and 8. The meeting link may be received from a meeting control panel, such as the meeting control panel 400 in FIG. 4, or the meeting link may be received through an email communication, a calendar invite, or other such electronic communication. In some examples, the meeting link may be automatically activated by the client device upon a meeting start time. The meeting link may be generated in response to a user input on a host-client device, such as is described in relation to FIG. 3

At step 1104, the client device may join the meeting in response to a selection of the meeting link. The meeting link may include information that causes the client device to join the meeting via the video conference provider utilizing a video conference application. At step 1106, the client device may execute the suggested application from the video conference application. In some examples, launching the suggested application may include generating an open prompt at the client device. In other examples, the meeting link may be configured to cause the suggested application to be opened to a specific location. The meeting link may not refer specifically to the suggested application. For example, the meeting link may reference a particular file that is associated with a related application. The client device may process the meeting link and determine that the particular file is referenced. The client device may then determine that the related application is installed on the client device and execute the related application via the video conferencing application. In another example, the meeting link may reference the suggested application explicitly, instead of or in addition to referencing a particular file.

The suggested app may also be controlled and displayed from the video conference application. In some examples, the suggested application may be executed by the client device in response to a determination that the suggested app is to be executed upon the start of any meeting.

In some examples, the suggested app may run in the background, and not be displayed in a meeting window. In other examples, the suggested app may run as part of or in addition to the video conference application. For example, the app may take information such as sound or audio data from the video conference and perform operations on the sound or video data. The app may also access data outside of the video conference application and perform operations on the outside data. The app may affect the video conference application, such as by changing a background or skin of the video conference application. The suggested app may be any sort of application including processor-executable instructions. Examples may include file sharing applications, games, design applications, polling applications, and any other application.

At step 1106, the client device may receive application content for the suggested application. For example, the application content may be received in response to the selection of the meeting link. The application content may be sent in the meeting link by a meeting participant and/or meeting host via the video conference provider. In some examples, the application content may include a specific location. The specific location may correspond to a logical container such as a folder, or a specific file. The specific location may also correspond to a particular operation of the suggested app.

In other examples, the client device may receive information about the application content via the video conference, such as by a link sent from the host or other participant in the video conference, e.g., via a chat message or based on the host or other participant opening the content in their application. In some examples, the user of the client device may select content to open in the application, which may also provide a notification to other conference participants to access the same content.

At step 1108, the client device may display the application content using the suggested application. For example, the application content may be displayed in an app window, such as app panel 808. The application content may include a specific file or operation. The application content may include a logical container with multiple files within.

In some examples, and in response to the selection of the meeting link, the client device may determine that the suggested app is not installed. The client device may receive a signal that causes an install prompt to be generated by the client device within the video conference application. The signal may be generated automatically by the client device, or may be transmitted by the video conference provider. In response to a user input corresponding to the install prompt, the client device may then receive data associated with the suggested application. Using the data associated with the suggested application, the client device may then install the suggested application on the client device.

In some examples, and in response to the selection of the meeting link, the client device may determine that the suggested application is installed on the client device. The client device may then generate an open prompt associated with the suggested application. The suggested application may then be executed and controlled by the client device from the video conference application. The client device may receive application content in response to the selection of the meeting link. The application content may be sent in the meeting link by a meeting participant and/or meeting host via the video conference provider. In some examples, the application content may include a specific location. The specific location may correspond to a logical container such as a folder, or a specific file. The specific location may also correspond to a particular operation of the suggested app. The client device may then display the application content using the suggested application. For example, the application content may be displayed in an app window, such as app panel 808. The application content may include a specific file or operation. The application content may include a logical container with multiple files within.

Figure 12:
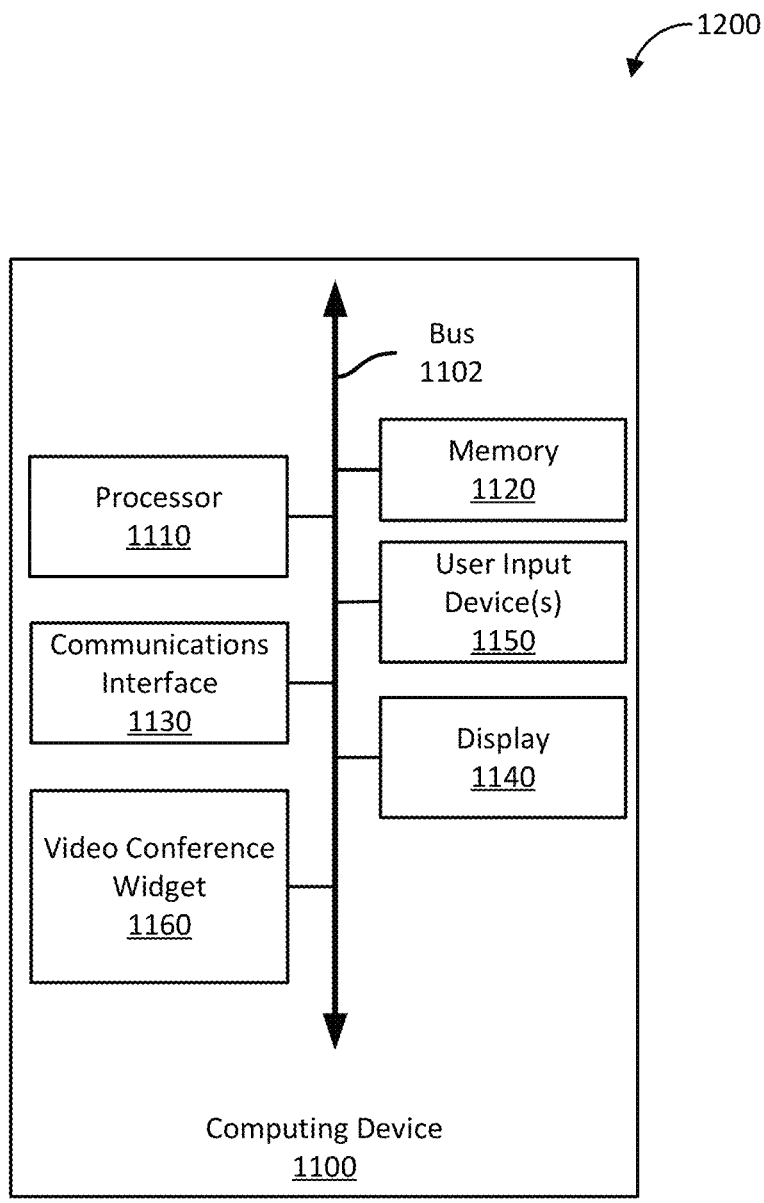
FIG. 12 shows an example computing device suitable for use in example systems or methods for providing applications in a meeting, according to certain examples.

FIG. 12 shows an example computing device 1200 suitable for use in example systems or methods for providing applications in a meeting, according to certain examples. The example computing device 1200 includes a processor 1210 which is in communication with the memory 1220 and other components of the computing device 1200 using one or more communications buses 1202. The processor 1210 is configured to execute processor-executable instructions stored in the memory 1220 to perform one or more methods for providing applications in a meeting, such as part or all of the methods 900, 1000 and 1200 described above with respect to FIGS. 9, 10, 11. The computing device, in this example, also includes one or more user input devices 1250, such as a keyboard, mouse, touchscreen, video input device (e.g., one or more cameras), microphone, etc., to accept user input. The computing device 1200 also includes a display 1240 to provide visual output to a user.

The computing device 1200 also includes a communications interface 1230. In some examples, the communications interface 1230 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method including receiving, by a client device, a meeting link for a meeting hosted by a video conference provider, the meeting link including information associated with a suggested application. In response to a selection of the meeting link, joining the meeting via the video conference provider utilizing a video conference application and executing the suggested application by the client device, where the suggested application is controlled by the client device from the video conference application. Receiving application content from a meeting participant via the video conference provider and displaying the application content using the suggested application.

Example 2 is the method of any previous or subsequent example, where the meeting link is automatically activated by the client device upon a meeting start time.

Example 3 is the method of any previous or subsequent example, further including: determining, by the client device, that the suggested application is not installed on the client device. Receiving, by the client device, a signal that causes an install prompt to be generated by the client device. Receiving, by the client device, and in response to a user input corresponding to the install prompt, data associated with the suggested application. Installing, by the client device, and using the data associated with the suggested application, the suggested application on the client device.

Example 4 is the method of any previous or subsequent example, further including: determining, by the client device, that the suggested application is installed on the client device. Generating, by the client device, an open prompt associated with the suggested application. Executing the suggested application by the client device, where the suggested application is controlled from the video conference application. Receiving application content from a meeting participant via the video conference provider. Displaying the application content using the suggested application.

Example 5 is the method of any previous or subsequent example, where the meeting link is generated in response to a user input on a host-client device.

Example 6 is the method of any previous or subsequent example, where the client device executes the suggested app in response to a determination that the suggested is to be executed upon a start of any meeting.

Example 7 is the method of any previous or subsequent example, where the meeting link is provided by at least one of email communication or calendar invite.

Example 8 is a computer-readable medium including processor-readable instructions configured to be executed by a processor, that when executed cause the processor to receive by a client device, a meeting link for a meeting hosted by a video conference provider, the meeting link including information associated with a suggested application. In response to a selection of the meeting link, join the meeting via the video conference provider utilizing a video conference application and execute the suggested application by the client device, where the suggested application is controlled by the client device from the video conference application. Receive application content from a meeting participant via the video conference provider, then display the application content using the suggested application.

Example 9 is the computer-readable medium of any previous or subsequent example, where the meeting link is automatically activated by the client device upon a meeting start time.

Example 10 is the computer-readable medium of any previous or subsequent example, where the instructions further cause the processor to determine that the suggested application is not installed on the client device. The processor may receive a signal that causes an install prompt to be generated by the client device. The processor may then receive, in response to a user input corresponding to the install prompt, data associated with the suggested application The processor may then install, using the data associated with the suggested application, the suggested application on the client device.

Example 11 is the computer-readable medium of any previous or subsequent example, where the instructions further cause the processor to determine that the suggested application is installed on the client device. The processor may generate an open prompt associated with the suggested application and execute the suggested application by the client device, where the suggested application is controlled from the video conference application. The processor may receive application content from a meeting participant via the video conference provider and display the application content using the suggested application.

Example 12 is the computer-readable medium of any previous or subsequent example, where the meeting link is generated in response to a user input on a host-client device.

Example 13 is the computer-readable medium of any previous or subsequent example, where the client device executes the suggested app in response to a determination that the suggested is to be executed upon a start of any meeting.

Example 14 is the computer-readable medium of any previous or subsequent example, where the meeting link is provided by at least one of email communication or calendar invite.

Example 15 is a system including a non-transitory computer-readable medium; and a processor communicatively coupled to the non-transitory computer-readable medium. The processor may be configured to execute processor-executable instructions stored in the non-transitory computer-readable medium to receive by a client device, a meeting link for a meeting hosted by a video conference provider. The meeting link may include information associated with a suggested application. In response to a selection of the meeting link, the processor may join the meeting via the video conference provider utilizing a video conference application and execute the suggested application by the client device, where the suggested application is controlled by the client device from the video conference application. The processor may receive application content from a meeting participant via the video conference provider and display the application content using the suggested application.

Example 16 is the system of any previous or subsequent example, the processor further configured to execute processor-executable instructions stored in the non-transitory computer-readable medium to: determine that the suggested application is not installed on the client device The processor may then receive a signal that causes an install prompt to be generated by the client device. The processor may receive, in response to a user input corresponding to the install prompt, data associated with the suggested application. The processor may install, using the data associated with the suggested application, the suggested application on the client device.

Example 17 is the system of any previous or subsequent example, the processor further configured to execute processor-executable instructions stored in the non-transitory computer-readable medium to determine that the suggested application is installed on the client device. The processor may generate an open prompt associated with the suggested application and execute the suggested application by the client device. The suggested application may be controlled from the video conference application. The processor may receive application content from a meeting participant via the video conference provider and display the application content using the suggested application.

Example 18 is the system of any previous or subsequent example, where the meeting link is automatically activated by the client device upon a meeting start time.

Example 19 is the system of any previous or subsequent example, where the client device executes the suggested app in response to a determination that the suggested is to be executed upon a start of any meeting.

Example 20 is the system of any previous or subsequent example, where the meeting link is provided by at least one of email communication or calendar invite.

What is claimed is:

1. A method comprising:
   receiving, by a client device, a meeting link for a meeting hosted by a video conference provider, the meeting link comprising information associated with a suggested application;
   in response to a selection of the meeting link:
      joining the meeting via the video conference provider utilizing a video conference application; and
      executing the suggested application by the client device, wherein the suggested application is controlled by the client device from the video conference application;
   receiving application content from a meeting participant via the video conference provider; and
   displaying the application content using the suggested application.

2. The method of claim 1, wherein the meeting link is automatically activated by the client device upon a meeting start time.

3. The method of claim 1, further comprising:
   determining, by the client device, that the suggested application is not installed on the client device;
   receiving, by the client device, a signal that causes an install prompt to be generated by the client device;
   receiving, by the client device, and in response to a user input corresponding to the install prompt, data associated with the suggested application; and
   installing, by the client device, and using the data associated with the suggested application, the suggested application on the client device.

4. The method of claim 1, further comprising:
   determining, by the client device, that the suggested application is installed on the client device;
   generating, by the client device, an open prompt associated with the suggested application;
   executing the suggested application by the client device, wherein the suggested application is controlled from the video conference application;
   receiving application content from a meeting participant via the video conference provider; and
   displaying the application content using the suggested application.

5. The method of claim 1, wherein the meeting link is generated in response to a user input on a host-client device.

6. The method of claim 1, wherein the client device executes the suggested app in response to a determination that the suggested is to be executed upon a start of any meeting.

7. The method of claim 1, wherein the meeting link is provided by at least one of email communication or calendar invite.

8. A non-transitory computer-readable medium comprising processor-readable instructions configured to be executed by a processor, that when executed cause the processor to:
   receive by a client device, a meeting link for a meeting hosted by a video conference provider, the meeting link comprising information associated with a suggested application;
   in response to a selection of the meeting link:
   join the meeting via the video conference provider utilizing a video conference application; and
   execute the suggested application by the client device, wherein the suggested application is controlled by the client device from the video conference application;
   receive application content from a meeting participant via the video conference provider; and
   display the application content using the suggested application.

9. The non-transitory computer-readable medium of claim 8, wherein the meeting link is automatically activated by the client device upon a meeting start time.

10. The non-transitory computer-readable medium of claim 8, wherein the instructions further cause the processor to:
  determine that the suggested application is not installed on the client device;
  receive a signal that causes an install prompt to be generated by the client device;
  receive and in response to a user input corresponding to the install prompt, data associated with the suggested application; and
  install, using the data associated with the suggested application, the suggested application on the client device.

11. The non-transitory computer-readable medium of claim 8, wherein the instructions further cause the processor to:
  determine that the suggested application is installed on the client device;
  generate, an open prompt associated with the suggested application;
  execute the suggested application by the client device, wherein the suggested application is controlled from the video conference application;
  receive application content from a meeting participant via the video conference provider; and
  display the application content using the suggested application.

12. The non-transitory computer-readable medium of claim 8, wherein the meeting link is generated in response to a user input on a host-client device.

13. The non-transitory computer-readable medium of claim 8, wherein the client device executes the suggested app in response to a determination that the suggested is to be executed upon a start of any meeting.

14. The non-transitory computer-readable medium of claim 8, wherein the meeting link is provided by at least one of email communication or calendar invite.

15. A system comprising:
  a non-transitory computer-readable medium; and
  a processor communicatively coupled to the non-transitory computer-readable medium, the processor configured to execute processor-executable instructions stored in the non-transitory computer-readable medium to:
  receive by a client device, a meeting link for a meeting hosted by a video conference provider, the meeting link comprising information associated with a suggested application;
  in response to a selection of the meeting link:
  join the meeting via the video conference provider utilizing a video conference application; and
  execute the suggested application by the client device, wherein the suggested application is controlled by the client device from the video conference application;
  receive application content from a meeting participant via the video conference provider; and
  display the application content using the suggested application.

16. The system of claim 15, the processor further configured to execute processor-executable instructions stored in the non-transitory computer-readable medium to:
  determine that the suggested application is not installed on the client device;
  receive a signal that causes an install prompt to be generated by the client device;
  receive and in response to a user input corresponding to the install prompt, data associated with the suggested application; and
  install, using the data associated with the suggested application, the suggested application on the client device.

17. The system of claim 15, the processor further configured to execute processor-executable instructions stored in the non-transitory computer-readable medium to:
  determine that the suggested application is installed on the client device;
  generate, an open prompt associated with the suggested application;
  execute the suggested application by the client device, wherein the suggested application is controlled from the video conference application;
  receive application content from a meeting participant via the video conference provider; and
  display the application content using the suggested application.

18. The system of claim 15, wherein the meeting link is automatically activated by the client device upon a meeting start time.

19. The system of claim 15, wherein the client device executes the suggested app in response to a determination that the suggested is to be executed upon a start of any meeting.

20. The system of claim 15, wherein the meeting link is provided by at least one of email communication or calendar invite.

* * * * *